(12) United States Patent
Uchiyama et al.

(10) Patent No.: US 9,334,163 B2
(45) Date of Patent: May 10, 2016

(54) HYDROGEN STORAGE METHOD

(71) Applicants: Naoki Uchiyama, Hamamatsu (JP);
Tomomi Kanai, Hamamatsu (JP);
Kazumi Harada, Hamamatsu (JP)

(72) Inventors: Naoki Uchiyama, Hamamatsu (JP);
Tomomi Kanai, Hamamatsu (JP);
Kazumi Harada, Hamamatsu (JP)

(73) Assignee: KABUSHIKI KAISHA ATSUMITEC, Shizuoka (JP)

( * ) Notice: Subject to any disclaimer, the term of this patent is extended or adjusted under 35 U.S.C. 154(b) by 22 days.

(21) Appl. No.: 14/357,161

(22) PCT Filed: Oct. 25, 2012

(86) PCT No.: PCT/JP2012/077534
§ 371 (c)(1),
(2) Date: May 8, 2014

(87) PCT Pub. No.: WO2013/069464
PCT Pub. Date: May 16, 2013

(65) Prior Publication Data
US 2014/0286856 A1   Sep. 25, 2014

(30) Foreign Application Priority Data

Nov. 8, 2011   (JP) .................................. 2011-244373

(51) Int. Cl.
| | |
|---|---|
| *C01B 3/08* | (2006.01) |
| *C01B 3/00* | (2006.01) |
| *C22C 23/00* | (2006.01) |
| *H01M 4/24* | (2006.01) |
| *H01M 4/38* | (2006.01) |
| *H01M 4/46* | (2006.01) |

(52) U.S. Cl.
CPC ............. *C01B 3/0084* (2013.01); *C01B 3/0042* (2013.01); *C22C 23/00* (2013.01); *H01M 4/242* (2013.01); *H01M 4/383* (2013.01); *H01M 4/46* (2013.01); *Y02E 60/124* (2013.01); *Y02E 60/327* (2013.01)

(58) Field of Classification Search
USPC ....................................................... 423/658.2
See application file for complete search history.

(56) References Cited

U.S. PATENT DOCUMENTS

| | | | |
|---|---|---|---|
| 5,199,972 A | 4/1993 | Bogdanovic | |
| 6,835,490 B1 * | 12/2004 | Okada et al. ..................... | 429/59 |
| 2006/0216598 A1 * | 9/2006 | Shih ........................... | 429/218.2 |
| 2012/0100065 A1 | 4/2012 | Tung et al. | |

FOREIGN PATENT DOCUMENTS

| | | |
|---|---|---|
| EP | 1 176 219 | 1/2002 |
| JP | 11-343524 | 12/1999 |

(Continued)

*Primary Examiner* — Melvin C Mayes
*Assistant Examiner* — Kenneth Vaden
(74) *Attorney, Agent, or Firm* — Cozen O'Connor

(57) ABSTRACT

A hydrogen storage method is provided which enables a hydrogen storage alloy to store hydrogen up to a maximum hydrogen storage amount thereof in excess of a generally known theoretical value. In a hydrogenation step, a hydrogen storage ratio calculated as an atomic weight ratio between hydrogen and the hydrogen storage alloy is obtained beforehand as a theoretical value, a pressure at which the hydrogen storage alloy stores hydrogen up to the theoretical value is set as a first pressure value, a pressure value ten or more times greater than the first pressure value is set as a second pressure value, and pressure is increased up to the second pressure value. In a dehydrogenation step, the pressure is decreased from the second pressure value to or below the first pressure value. The hydrogenation step and the dehydrogenation step are repeatedly executed.

2 Claims, 1 Drawing Sheet

(56) References Cited

FOREIGN PATENT DOCUMENTS

| JP | 2003-193166 | 7/2003 |
| JP | 2007-046119 | 2/2007 |
| JP | 2007046119 A * | 2/2007 |
| JP | 2010-210242 | 9/2010 |

* cited by examiner

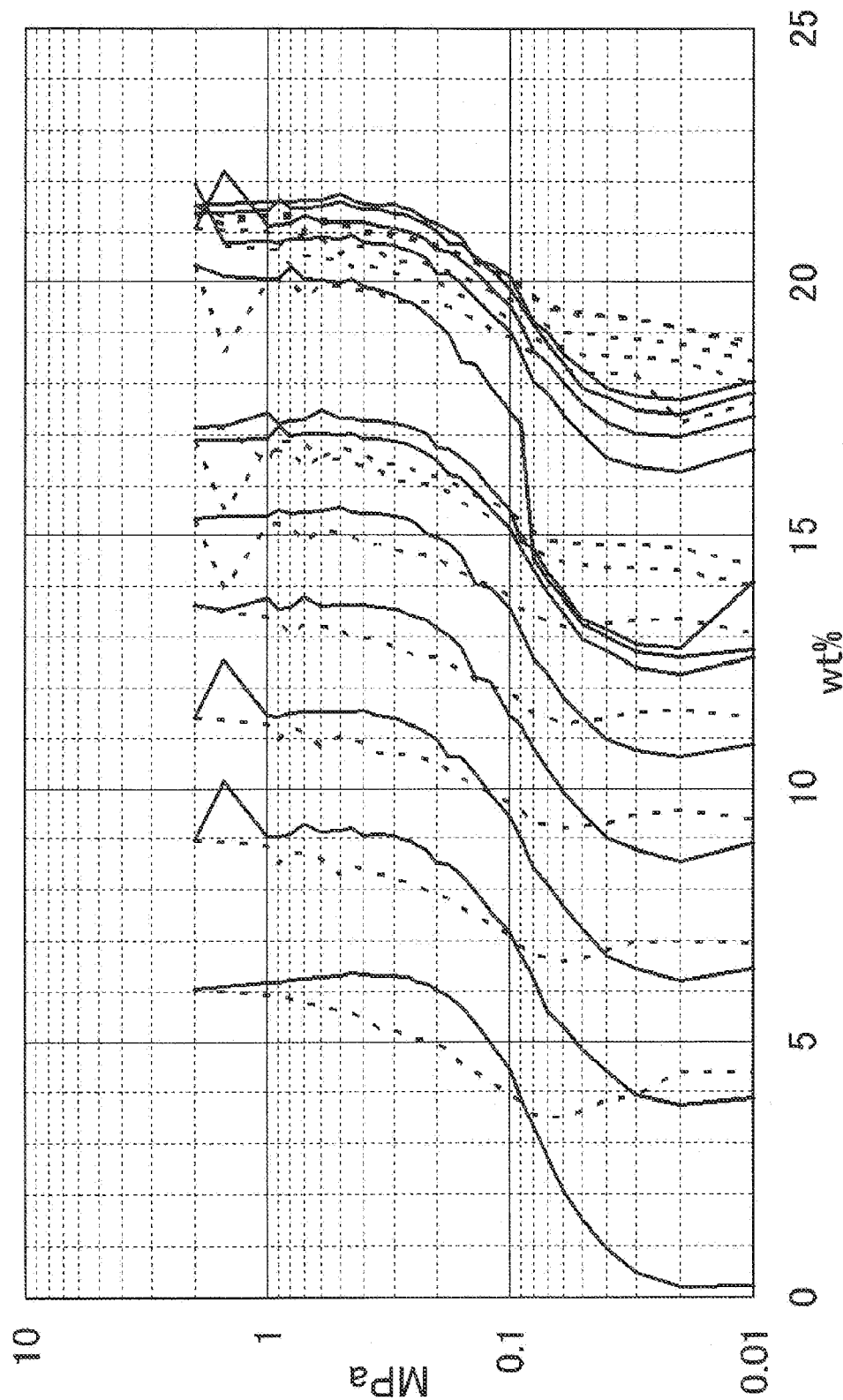

HYDROGEN STORAGE METHOD

RELATED APPLICATIONS

This is a U.S. National stage of International application No. PCT/JP2012/077534 filed on Oct. 25, 2012.

This patent application claims the priority of Japanese application no. 2011-244373 filed Nov. 8, 2011, the disclosure content of which is hereby incorporated by reference.

TECHNICAL FIELD

The present invention relates to a hydrogen storage method using a hydrogen storage alloy, in particular, a hydrogen storage alloy in the form of a thin film.

BACKGROUND ART

A hydrogen sensor is disclosed in Patent Document 1. An alloy used in this hydrogen sensor to store hydrogen is in the form of a thin film. The hydrogen sensor detects storage of hydrogen by making use of the property that the optical reflectivity of the alloy changes as the alloy stores hydrogen.

Such an alloy capable of storing hydrogen can be used not only as a sensor but as an electrode of a hydrogen storage cell. Where the alloy is used as an electrode, it is desirable that the alloy should be able to store as much hydrogen as possible. However, hydrogen storage alloy has its own theoretical value represented by a ratio up to which hydrogen can be stored in the alloy, and it is not generally known that hydrogen storage alloy is capable of storing hydrogen in an amount exceeding its theoretical value.

PRIOR ART DOCUMENT

Patent Document

Patent Document 1: Japanese Unexamined Patent Publication No. 2010-210242

SUMMARY OF THE INVENTION

Problems to be Solved by the Invention

The present invention was created in view of the aforementioned conventional art, and an object thereof is to provide a hydrogen storage method whereby a hydrogen storage alloy can be made to store hydrogen up to its own maximum hydrogen storage amount exceeding a generally known theoretical value.

Means for Solving the Problems

To achieve the object, the present invention provides a hydrogen storage method including: a hydrogenation step of hydrogenating a hydrogen storage alloy while increasing pressure in an atmosphere; and a dehydrogenation step of dehydrogenating the hydrogenated hydrogen storage alloy while decreasing the pressure in the atmosphere, wherein in the hydrogenation step, a hydrogen storage ratio calculated as an atomic weight ratio between hydrogen and the hydrogen storage alloy is obtained beforehand as a theoretical value, a pressure at which the hydrogen storage alloy stores hydrogen up to the theoretical value is set as a first pressure value, a pressure value ten or more times greater than the first pressure value is set as a second pressure value, and the pressure in the atmosphere is increased up to the second pressure value; in the dehydrogenation step, the pressure in the atmosphere is decreased from the second pressure value to or below the first pressure value; and the hydrogenation step and the dehydrogenation step are repeatedly executed.

The hydrogen storage alloy preferably has a particle sized in less than 10 nm.

Advantageous Effects of the Invention

According to the present invention, hydrogen storage alloy can store hydrogen in excess of its theoretical value by repeatedly executing the hydrogenation step and the dehydrogenation step.

Also, by using hydrogen storage alloy with a particle sized in less than 10 nm, more particularly, a particle size of 5 nm or less, it is possible to lower the first pressure value, and since the second pressure value lowers correspondingly, it is unnecessary to apply a very high pressure for the storage of hydrogen.

BRIEF DESCRIPTION OF THE DRAWINGS

FIG. 1 is a graph showing the relationship between hydrogen storage amount and pressure during execution of a hydrogen storage method according to the present invention.

MODE FOR CARRYING OUT THE INVENTION

FIG. 1 illustrates an exemplary case where $Mg_6Ni$ is used as a hydrogen storage alloy. Specifically, $Mg_6Ni$ was sputtered on both surfaces of each aramid film substrate with a size of 150 mm×150 mm, to prepare four hydrogen storage alloy plates. The hydrogen storage alloy plates were exposed to a hydrogen atmosphere in an environment of 30° C. and were repeatedly subjected to a hydrogenation step and a dehydrogenation step. The hydrogenation step is executed while increasing the pressure in the hydrogen atmosphere (in FIG. 1, indicated by solid lines). On the other hand, the dehydrogenation step is executed while decreasing the pressure in the hydrogen atmosphere (in FIG. 1, indicated by dotted lines).

According to the present invention, a first pressure value and a second pressure value are set in the hydrogenation step. To set the first pressure value, a theoretical value up to which the hydrogen storage alloy can store hydrogen is obtained in advance. The theoretical value can be calculated as an atomic weight ratio between hydrogen and the hydrogen storage alloy. Where the hydrogen storage alloy used is $Mg_2Ni$, for example, $Mg_2Ni$ can theoretically store four H atoms, as indicated by the following reaction formula:

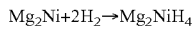
$$Mg_2Ni + 2H_2 \rightarrow Mg_2NiH_4$$

The atomic weight of Mg is 24.3050, the atomic weight of Ni is 58.6934, and the atomic weight of H is 1.00794. Accordingly, the atomic weight ratio of hydrogen to $Mg_2Ni$ in $Mg_2NiH_4$ is given by $$((1.00794 \times 4)/(24.3050 \times 2) + 58.6934) \times 100$$

and is found to be about 3.76 (wt %). In this manner, a hydrogen storage ratio of the hydrogen storage alloy to be used is obtained beforehand as the theoretical value.

On the other hand, in the case of $Mg_6Ni$ being used as the hydrogen storage alloy, the reaction formula is as follows:

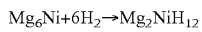
$$Mg_6Ni + 6H_2 \rightarrow Mg_2NiH_{12}$$

Accordingly, the atomic weight ratio of hydrogen to $Mg_6Ni$ in $Mg_6NiH_{12}$ is given by $$((1.00794\times12)/(24.3050\times6)+58.6934)\times100$$

and is found to be 5.91 (wt %).

A pressure at which hydrogen is stored up to the theoretical value is set as the first pressure value. In FIG. 1, the pressure corresponding to a theoretical value of 4.5 wt % is 0.1 MPa. Thus, the pressure corresponding to the theoretical value is set as the first pressure value. The second pressure value is set as a value ten or more times greater than the first pressure value. In the example illustrated in FIG. 1, 2 MPa, which is 20 times as great as the first pressure value, is set as the second pressure value.

The pressure in the hydrogen atmosphere is increased up to the second pressure value. Specifically, as the pressure in the hydrogen atmosphere rises above the first pressure value, more hydrogen is stored in excess of the theoretical value, and when the pressure in the hydrogen atmosphere is at a certain pressure value (in the example of FIG. 1, at around 0.3 MPa), the hydrogen storage ratio becomes almost constant (in the example of FIG. 1, about 6.2 wt %). The pressure in the hydrogen atmosphere is then further increased up to the second pressure value.

After the second pressure value is reached, the dehydrogenation step is executed. Specifically, the pressure in the hydrogen atmosphere is lowered from the second pressure value to or below the first pressure value. In the example of FIG. 1, the pressure is decreased to 0.01 MPa, which equals 1/10 of the first pressure value. It should be noted here that as the pressure in the hydrogen atmosphere decreases below the first pressure value, the hydrogen storage alloy begins to store hydrogen again. At the lowest pressure 0.01 MPa, about 4.5 wt % of hydrogen is stored.

Subsequently, the hydrogenation step is again executed, and as a result, more hydrogen is stored in the hydrogen storage alloy. Also in the second hydrogenation step, the pressure in the hydrogen atmosphere is raised up to the second pressure value. Then, also in the second dehydrogenation step, the pressure in the hydrogen atmosphere is lowered to the same pressure as in the first dehydrogenation step. As the hydrogenation and dehydrogenation steps are repeated thereafter, more and more hydrogen is stored in the hydrogen storage alloy, and the hydrogen storage ratio finally comes to follow a stable locus on the graph. In other words, the graph showing the relationship between the hydrogen storage ratio and the pressure in the hydrogenation step becomes nearly coincident with that showing the same relationship in the dehydrogenation step. At this stage, when the pressure in the hydrogen atmosphere is set at the first pressure value, about 20 wt % of hydrogen can be stored in the hydrogen storage alloy.

Thus, according to the present invention, hydrogen storage alloys can store hydrogen in excess of their theoretical values by repeatedly executing the hydrogenation step and the dehydrogenation step, and this was confirmed by experiment.

In conducting the experiment, particulate hydrogen storage alloy having a particle sized in less than 10 nm was used. Specifically, the hydrogen storage alloy used was in particulate form with a particle size of 5 nm or less. By using hydrogen storage alloy with a small particle size, it is possible to lower the first pressure value, and since the second pressure value lowers correspondingly, it is unnecessary to apply a very high pressure for the storage of hydrogen (hydrogen can be stored in a low-pressure environment). Also, the temperature in the hydrogen atmosphere can be set at a low temperature. Moreover, it is possible to shorten the time for the storage of hydrogen. Specifically, the hydrogenation step and the dehydrogenation step, which hitherto required 120 minutes to 160 minutes each, can individually be completed in about 90 minutes.

The invention claimed is:

1. A hydrogen storage method comprising:
   a hydrogenation step of hydrogenating a hydrogen storage alloy while increasing pressure in an atmosphere; and
   a dehydrogenation step of dehydrogenating the hydrogenated hydrogen storage alloy while decreasing the pressure in the atmosphere, wherein:
   in the hydrogenation step, a hydrogen storage ratio calculated as an atomic weight ratio between hydrogen and the hydrogen storage alloy is obtained beforehand as a theoretical value, a pressure corresponding to the theoretical value is set as a first pressure value, a pressure value ten or more times greater than the first pressure value is set as a second pressure value, and the pressure in the atmosphere is increased up to the second pressure value,
   in the dehydrogenation step, the pressure in the atmosphere is decreased from the second pressure value to or below the first pressure value, and
   the hydrogenation step and the dehydrogenation step are repeatedly executed so as to make the hydrogen storage alloy store hydrogen above the theoretical value.

2. The hydrogen storage method according to claim 1, wherein the hydrogen storage alloy has a particle sized in less than 10 nm.

* * * * *